(12) United States Patent
Teeter (10) Patent No.: US 6,869,243 B1
(45) Date of Patent: Mar. 22, 2005

(54) COTTER HAVING INDICATOR DEVICE (76) Inventor: Roger C. Teeter, 20720 Snag Island Dr., Sumner, WA (US) 98390

( * ) Notice: Subject to any disclaimer, the term of this patent is extended or adjusted under 35 U.S.C. 154(b) by 0 days.

(21) Appl. No.: 10/819,489

(22) Filed: Apr. 6, 2004

(51) Int. Cl.⁷ .................................................. F16B 7/10
(52) U.S. Cl. .................................... 403/109.3; 403/378
(58) Field of Search ................................ 403/27, 109.3, 403/109.8, 109.6, 378, 379.1, 379

(56) References Cited

U.S. PATENT DOCUMENTS

| | | | |
|---|---|---|---|
| 5,433,552 A | * 7/1995 | Thyu | ........................... 403/378 |
| 5,718,660 A | 2/1998 | Chen | |
| 5,967,956 A | 10/1999 | Teeter | |
| 6,786,669 B2 | * 9/2004 | Tsui et al. | ................ 403/322.2 |

* cited by examiner

*Primary Examiner*—John R. Cottingham
(74) *Attorney, Agent, or Firm*—Charles E.. Baxley (57) ABSTRACT

A cotter is used for locking or latching tubes or extensions together, and includes a shank having a lower end, a handle attached to top of the shank, a ferrule slidably attached onto the shank and arranged between the handle and the lower end of the shank and having a portion applied with an indicating layer. A spring may bias the ferrule toward the handle, to have the handle to selectively shield the indicating layer of the ferrule, and to indicate whether the ferrule has been suitably biased toward the handle or not, and to indicate whether the tubes and the extensions have been safely locked or latched together or not.

9 Claims, 7 Drawing Sheets

COTTER HAVING INDICATOR DEVICE

BACKGROUND OF THE INVENTION

1. Field of the Invention

The present invention relates to a cotter or a locking or latching pin, and more particularly to a cotter having an indicator or warning device.

2. Description of the Prior Art

Typical exercisers, such as tilting inversion exercisers or spinal straightening exercisers have been developed and comprise an exercise table pivotally or rotatably supported on a base, and an ankle holder or a fastening frame attached to the exercise table to secure the ankle portions of the feet of the users to the exercise table.

For example, U.S. Pat. No. 5,718,660 to Chen, and U.S. Pat. No. 5,967,956 to Teeter disclose two of the typical tilting inversion exercisers or spinal straightening exercisers each including an ankle holder or a fastening frame attached to the exercise table to secure the ankle portions of the feet of the users to the exercise table.

In addition, the exercise table further includes an extension extendible and adjustable relative to the exercise table, to fit users of different heights. The typical tilting inversion exercisers or spinal straightening exercisers thus include a number of members or elements that are required to be secured or latched together with a number of cotters.

While exercising with the typical tilting inversion exercisers or spinal straightening exercisers, the users may be elevated and rotated relative to the base, and it will be safer for the users to operate the exercisers if the user takes care to make sure the pin is secured in a hole before inverting.

The typical cotters are simply provided to latch the members or elements together. However, the users may not make sure or may not verify whether the typical cotters have been completely engaged through the members or elements or not, and thus may not make sure whether the members or elements have been safely latched and secured together by the cotters or not. The new cotter will help the user to more easily verify that they are clamped securely.

The above paragraphs are provided to show that the typical exercisers may not be as clearly verified whether they have been safely latched and secured together by the cotters or not. The advantage of the invention will be described hereinafter.

The present invention has arisen to mitigate and/or obviate the afore-described disadvantages of the conventional cotters.

SUMMARY OF THE INVENTION

The primary objective of the present invention is to provide a cotter including an indicator or warning device to indicate or to warn the users whether the members or elements have been safely latched and secured together by the cotters or not, and to prevent the users from being hurt by the members or elements that have not been safely latched and secured together by the cotters.

The other objective of the present invention is to provide a cotter including an indicator or warning device having an orange, or any other high-visibility color, warning circle offered as an increased visual aid to verify that the pin is in place.

In accordance with one aspect of the invention, there is provided a cotter comprising a shank including a lower end, a handle attached to top of the shank, a ferrule including a bore formed therein to slidably receive the shank, and to slidably attach the ferrule onto the shank, the ferrule being arranged between the handle and the lower end of the shank, and the ferrule including a portion having an indicating layer provided thereon, and means for biasing the ferrule toward the handle, to have the handle to selectively shield the indicating layer of the ferrule, and to indicate whether the ferrule has been suitably biased toward the handle or not.

The ferrule includes an upper portion or an outer peripheral portion having the indicating layer provided thereon, and arranged to be selectively shielded by the handle.

The handle includes a lower neck engageable onto the upper portion of the ferrule to selectively shield the indicating layer of the ferrule, and includes an opening formed therein which is ergonomically designed to allow for comfortable two-finger operation, and includes a warning sign provided thereon, for warning purposes. The ferrule may include an inner thread formed therein for attaching to various objects.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1–7, a cotter 20 in accordance with the present invention is developed and provided for securing or latching two rods or beams or tubes 11 and extensions 12 together, such as for securing or latching two rods or beams or tubes 11 and extensions 12 of a tilting inversion exerciser or a spinal straightening exerciser 10 together, best shown in FIGS. 3–7. The tube 11 may include a number of orifices 13 formed therein, and the extension 12 may include a pipe 14 extended therefrom and an aperture 15 formed in the pipe 14 (FIGS. 5, 6) for selectively aligning with either of the orifices 13 of the tube 11.

The cotter 20 comprises a shank 21 slidably engageable into the pipe 14 of the extension 12, and including a peripheral bulge 22 radially extended out form the lower portion thereof, and including a lower end 23 for engaging through the aperture 15 of the extension 12 and for selectively engaging through either of the orifices 13 of the tube 11 (FIG. 5), to selectively lock or latch or secure the tubes 11 and the extensions 12 together.

Figure 5:
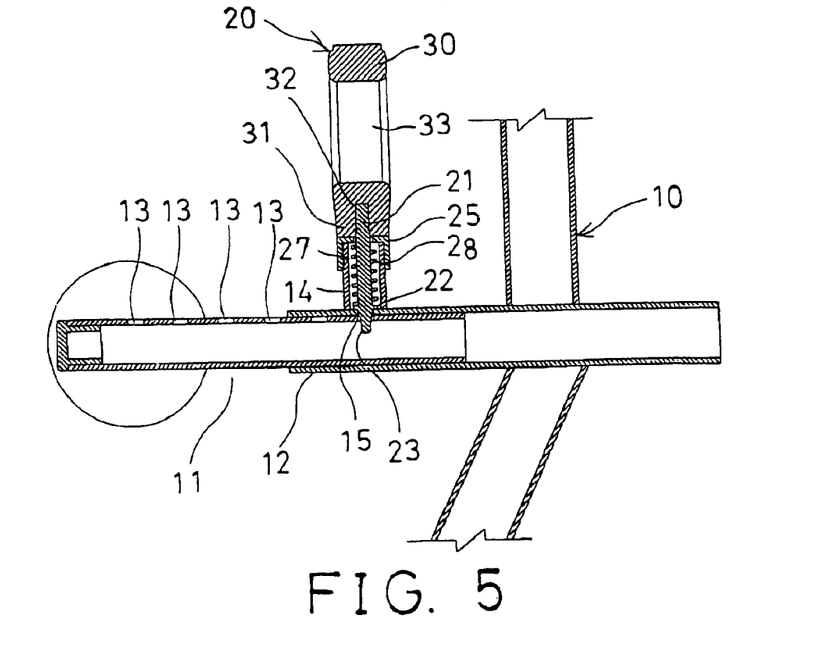
FIG. 5 is a partial cross sectional view taken along lines 5—5 of FIG. 3.
Figure 6:
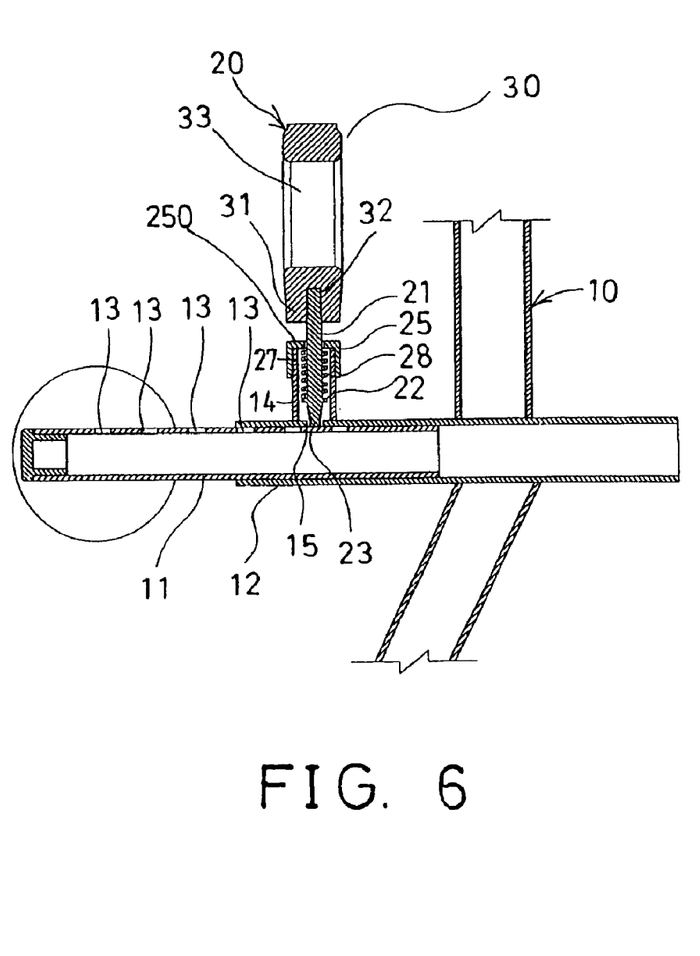
FIG. 6 is a partial cross sectional view similar to FIG. 5, illustrating the arrangement of the cotter as shown in FIG. 4.
Figure 9:
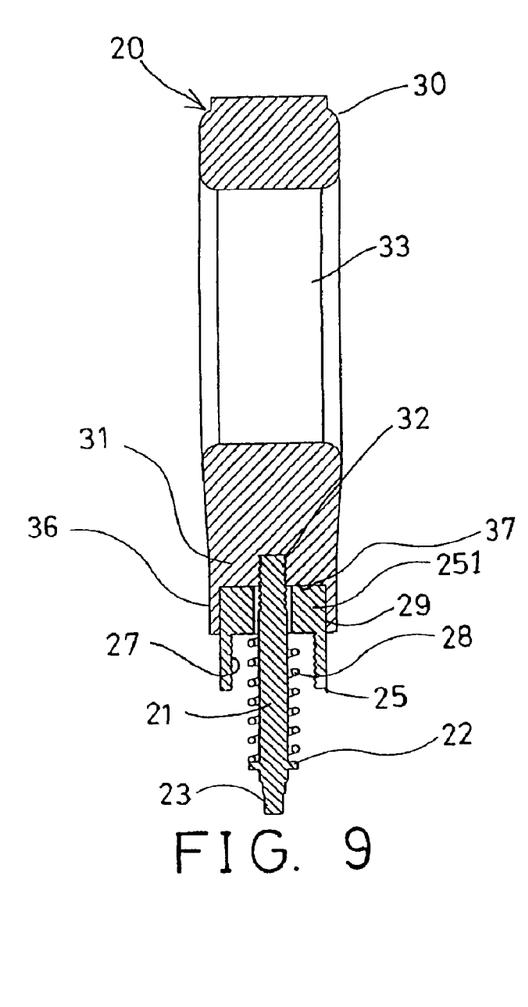
FIG. 9 is a cross sectional view taken along lines 9—9 of FIG. 8.

A ferrule 25 is slidably engaged onto the shank 21. For example, the ferrule 25 includes a bore 26 formed therein to slidably receive the shank 21, and to allow the ferrule 25 to be slidably engaged onto the shank 21. The ferrule 25 is attachable or fixable onto various objects, such as the pipe 14 of the extension 12 with such as an inner thread 27 (FIGS. 5, 6, 9).

A spring 28 may be engaged onto the shank 21 and engaged between the peripheral bulge 22 of the shank 21 and the ferrule 25, to bias the lower end 23 of the shank 21 to engage through the aperture 15 of the extension 12 and to selectively engage through either of the orifices 13 of the tube 11 (FIG. 5), and thus to bias the shank 21 to lock or latch or secure the tubes 11 and the extensions 12 together.

Figure 11:
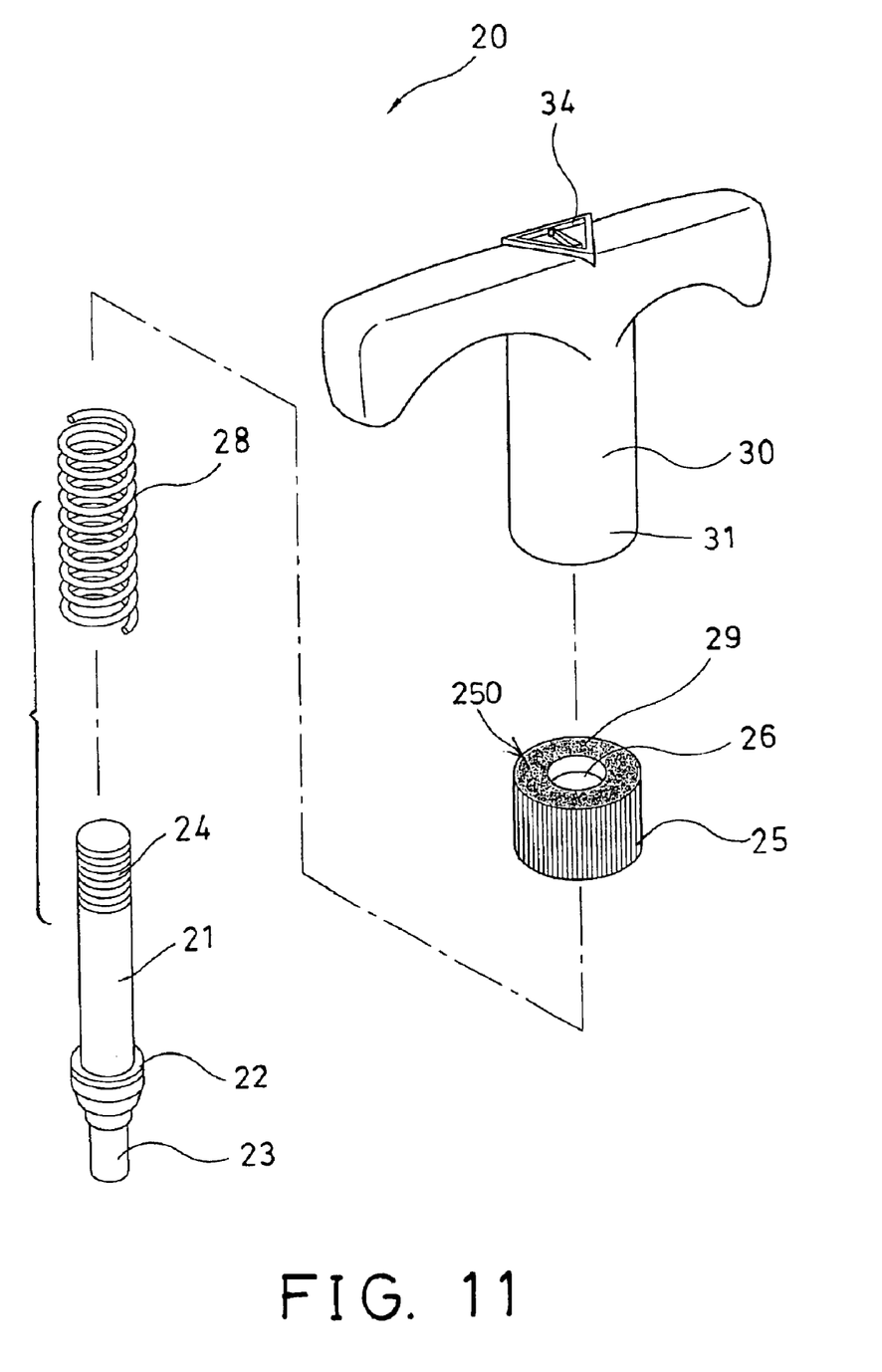
FIG. 11 is another exploded view illustrating the further embodiment of the cotter.

A handle 30 includes a lower neck 31 attached or secured to the shank 21 with such as an inner threading 32 which may be threaded with the outer thread 24 of the shank 21 (FIGS. 5, 6, 9), and located distal to the lower end 23 of the shank 21, and includes a heart-shaped opening 33 formed therein, which is provided for a comfortable and ergonomic hold on the handle, and includes a warning sign 34 formed or provided thereon, for warning the users. The handle 30 may also be formed into the other shape, such as the T-shape as shown in FIG. 11.

The ferrule 25 is thus arranged or slidably disposed between the ferrule 25 and the lower end 23 of the shank 21, and includes a portion, such as an upper portion 250 (FIGS. 1, 4, 11) or an outer peripheral portion 251 (FIGS. 9, 10) having an indicating or warning color or layer 29 applied thereon. The indicating or warning color or layer 29 of the ferrule 25 includes a color different from that of the ferrule 25 and that of the handle 30, to allow the indicating or warning color or layer 29 of the ferrule 25 to be easily seen by the users (FIGS. 4, 6).

Figure 1:
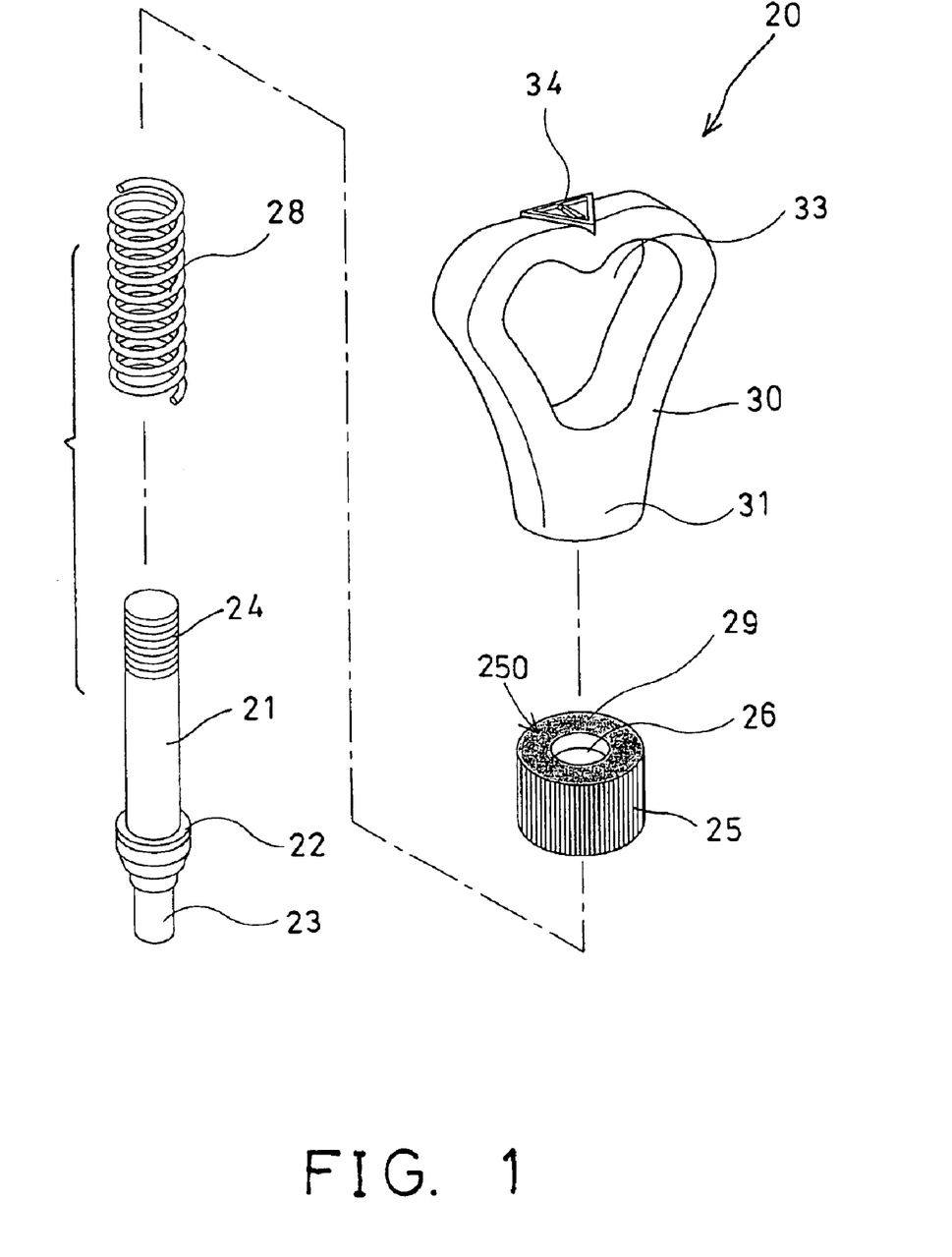
FIG. 1 is an exploded view of a cotter in accordance with the present invention.
Figure 2:
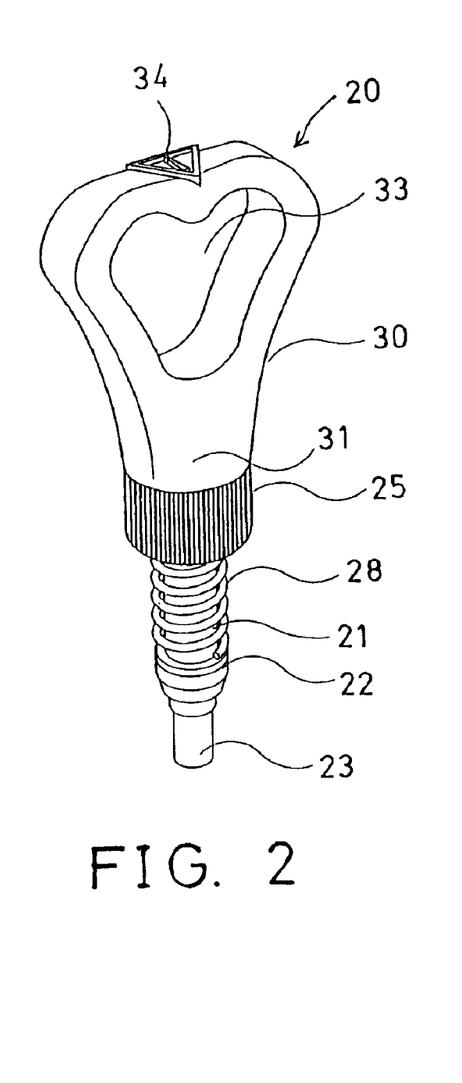
FIG. 2 is a perspective view of the cotter.
Figure 3:
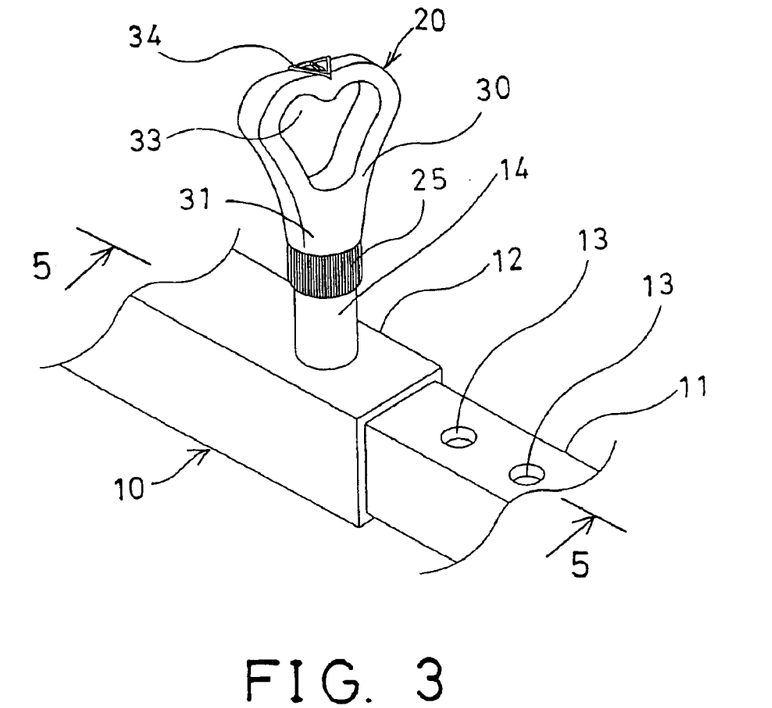
FIG. 3 is a perspective view illustrating the operation of the cotter.

In operation, as shown in FIGS. 2, 3, and 5, the spring 28 is engaged between the peripheral bulge 22 of the shank 21 and the ferrule 25, and may bias the ferrule 25 toward the handle 30, and may bias the lower end 23 of the shank 21 to selectively engage through either of the orifices 13 of the tube 11 (FIG. 5), and thus may bias the lower neck 31 of the handle 30 to engage onto or to cover or shield the indicating or warning color or layer 29 of the ferrule 25 (FIGS. 3, 5), and thus to shield and to prevent the indicating or warning color or layer 29 of the ferrule 25 from being seen by the users.

When the indicating or warning color or layer 29 of the ferrule 25 is shielded or covered by the lower neck 31 of the handle 30, the indicating or warning color or layer 29 of the ferrule 25 will not be exposed, and the users may not see the indicating or warning color or layer 29 of the ferrule 25, such that the users may make sure that the lower end 23 of the shank 21 has been safely engaged through either of the orifices 13 of the tube 11, and to safely lock or latch or secure the tubes 11 and the extensions 12 together.

Figure 4:
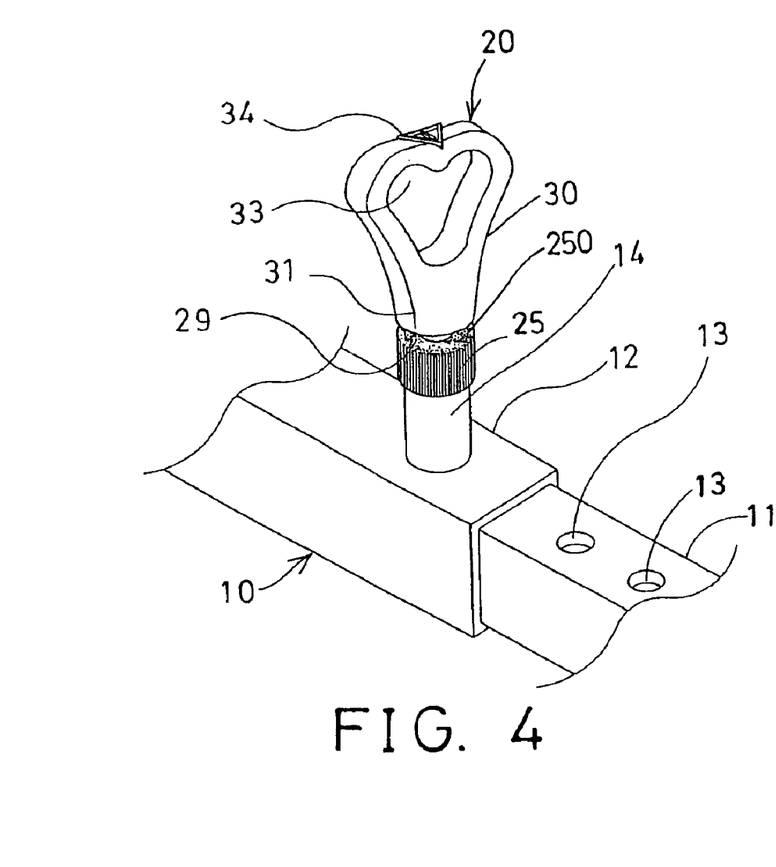
FIG. 4 is a perspective view similar to FIG. 3, illustrating the operation of the cotter.

On the contrary, as shown in FIGS. 4 and 6, when the lower end 23 of the shank 21 is not engaged through the orifices 13 of the tube 11, the lower neck 31 of the handle 30 will be spaced away from the ferrule 25, such that the lower neck 31 of the handle 30 may not cover or shield the indicating or warning color or layer 29 of the ferrule 25, and such that the indicating or warning color or layer 29 of the ferrule 25 may be exposed, and may be seen by the users.

Accordingly, when the indicating or warning color or layer 29 of the ferrule 25 has not been shielded or covered by the lower neck 31 of the handle 30, or when the indicating or warning color or layer 29 of the ferrule 25 has been exposed, the users may see the indicating or warning color or layer 29 of the ferrule 25, and thus may know that the lower end 23 of the shank 21 has not been safely engaged through either of the orifices 13 of the tube 11, and may thus realize that the tubes 11 and the extensions 12 have not been safely locked or latched or secured together.

Figure 7:
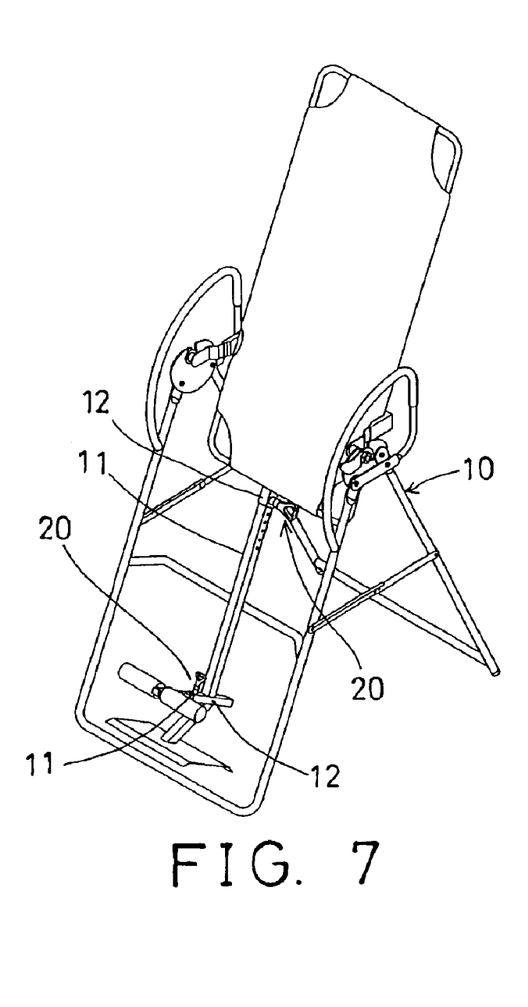
FIG. 7 is a perspective view illustrating a tilting inversion exerciser or a spinal straightening exerciser employing one or more cotter in accordance with the present invention.

The users may then take action to suitably engage the lower end 23 of the shank 21 through either of the orifices 13 of the tube 11, and to safely lock or latch or secure the tubes 11 and the extensions 12 together, and to prevent the tubes 11 and the extensions 12 from being separated or disengaged from each other while conducting exercising operations, particularly with the tilting inversion exerciser or the spinal straightening exerciser 10 as shown in FIG. 7.

Figure 8:
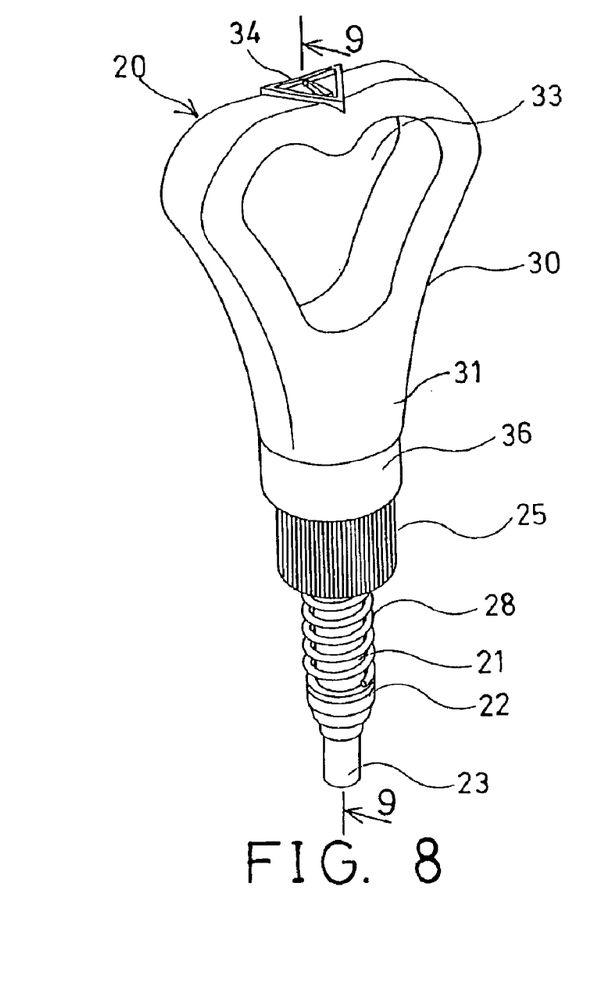
FIG. 8 is a perspective view illustrating the other embodiment of the cotter.
Figure 10:
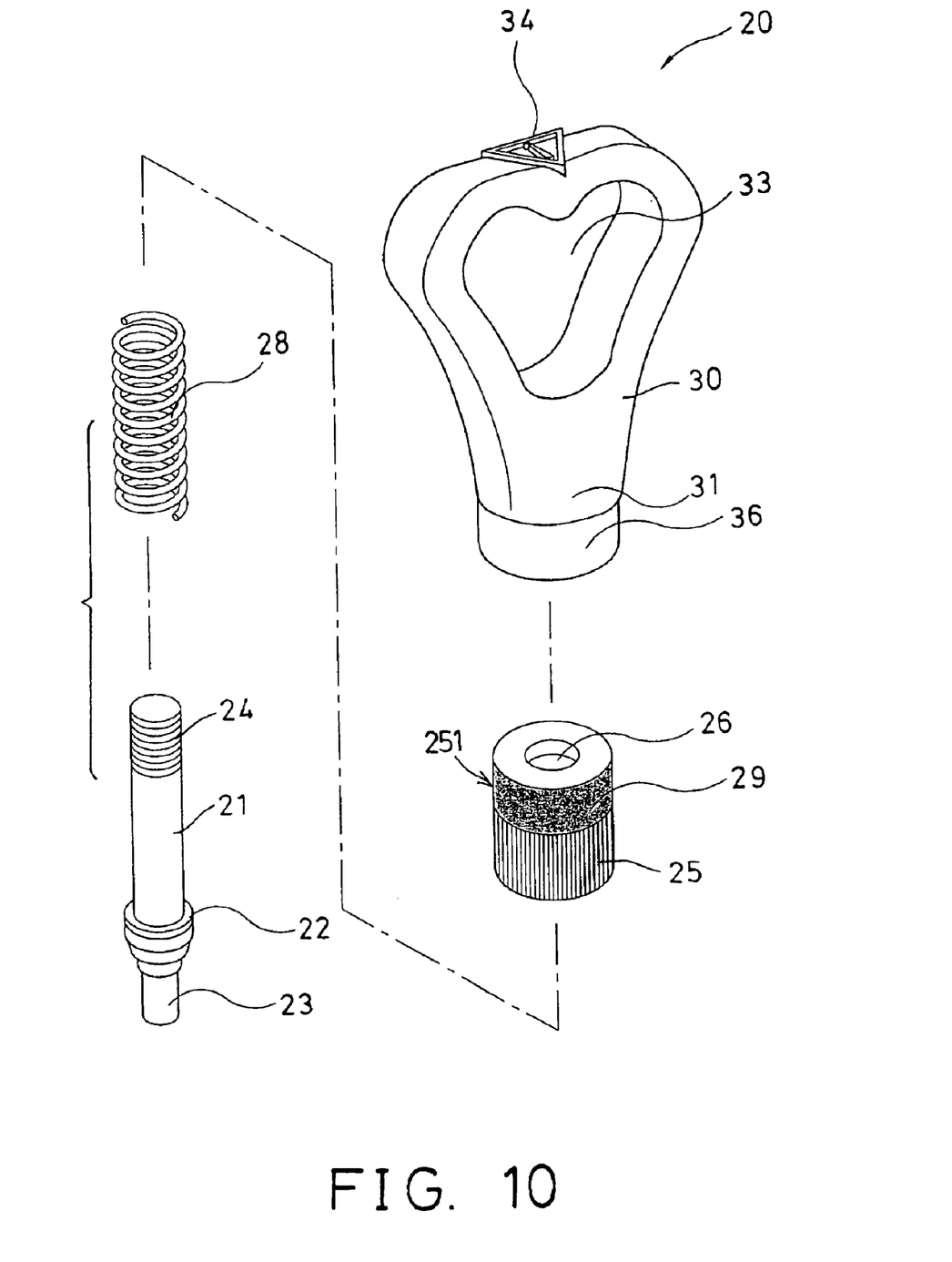
FIG. 10 is an exploded view illustrating the cotter as shown in FIGS. 8 and 9.

Referring next to FIGS. 8–10, alternatively, the ferrule 25 may include an upper and outer peripheral portion 251 having the indicating or warning color or layer 29 applied thereon which also includes a color different from that of the ferrule 25 and that of the handle 30, to allow the indicating or warning color or layer 29 of the ferrule 25 to be easily seen by the users.

The handle 30 may include a chamber 37 formed in the lower portion thereof, and formed or defined by a peripheral wall 36, to receive the upper and outer peripheral portion 251 of the ferrule 25, and to selectively cover or shield the indicating or warning color or layer 29 of the ferrule 25, and thus to indicate whether the lower end 23 of the shank 21 has been safely engaged through either of the orifices 13 of the tube 11 or not, and to know whether the tubes 11 and the extensions 12 have been safely locked or latched or secured together or not.

It is preferable that the indicating or warning color or layer 29 of the ferrule 25 includes a color not only different from but also in contrast to that of the ferrule 25 and that of the handle 30, to allow the indicating or warning color or layer 29 of the ferrule 25 to be easily and clearly seen by the users.

Accordingly, the cotter in accordance with the present invention includes an indicator or warning device to indicate or to warn the users whether the members or elements have been safely latched and secured together by the cotters or not, and to prevent the users from being hurt by the members or elements that have not been safely latched and secured together by the cotters.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cotter comprising:

a shank including a lower end, a handle attached to top of said shank, and including a lower neck, a ferrule including a bore formed therein to slidably receive said shank, and to slidably attach said ferrule onto said shank, said ferrule being arranged between said handle and said lower end of said shank, and said ferrule including an upper portion having an indicating layer provided thereon, and arranged to be selectively shielded by said handle, said lower neck of said handle being engageable onto said upper portion of said ferrule to selectively shield said indicating layer of said ferrule, means for biasing said ferrule toward said handle, to have said handle to selectively shield said indicating layer of said ferrule, and to indicate whether said ferrule has been suitably biased toward said handle or not, and said indicating layer of said ferrule including a high-visibility color different from that of said ferrule and said handle, and offered as an increased visual aid to verify that said shank is in place.

2. The cotter as claimed in claim 1, wherein said handle includes an opening formed therein for ease and comfort of use.

3. The cotter as claimed in claim 1, wherein said handle includes a warning sign provided on top thereof, for warning purposes.

4. The cotter as claimed in claim 1, wherein said ferrule includes an inner thread formed therein for attaching to various objects.

5. A cotter comprising:

a shank including a lower end, a ferrule including a bore formed therein to slidably receive said shank, and to slidably attach said ferrule onto said shank, and said ferrule including an outer peripheral portion having an indicating layer provided thereon, a handle attached to top of said shank, and arranged to have said ferrule to be arranged between said handle and said lower end of said shank, said shank including a chamber formed therein to selectively receive said outer peripheral portion of said ferrule and to selectively shield said indicating layer of said ferrule, and means for biasing said ferrule toward said handle, to have said outer peripheral portion of said ferrule to be selectively engage into said chamber of said shank, and to have said indicating layer of said ferrule to be selectively shielded by said handle, and to indicate whether said ferrule has been suitably biased toward said handle or not, and said indicating layer of said ferrule including a high-visibility color different from that of said ferrule and said handle, and offered as an increased visual aid to verify that said shank is in place.

6. The cotter as claimed in claim 5, wherein said handle includes a peripheral wall to form said chamber thereof, and to selectively receive said outer peripheral portion of said ferrule.

7. The cotter as claimed in claim 5, wherein said handle includes an opening formed therein for ease and comfort of use.

8. The cotter as claimed in claim 5, wherein said handle includes a warning sign provided thereon, for warning purposes.

9. The cotter as claimed in claim 5, wherein said ferrule includes an inner thread formed therein for attaching to various objects.

* * * * *